(12) United States Patent
Palmer et al.

(10) Patent No.: US 10,196,314 B2
(45) Date of Patent: Feb. 5, 2019

(54) METHOD OF PREPARING A MULTIMODAL CUBIC BORON NITRIDE POWDER

(71) Applicant: DIAMOND INNOVATIONS, INC., Worthington, OH (US)

(72) Inventors: Jacob Palmer, Westerville, OH (US); Lawrence Dues, Dublin, OH (US); Rui Shao, Dublin, OH (US); Gerold Weinl, Alvsjo (SE)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 15/527,764

(22) PCT Filed: Nov. 18, 2015

(86) PCT No.: PCT/US2015/061292
§ 371 (c)(1),
(2) Date: May 18, 2017

(87) PCT Pub. No.: WO2016/081571
PCT Pub. Date: May 26, 2016

(65) Prior Publication Data
US 2017/0355644 A1    Dec. 14, 2017

Related U.S. Application Data

(60) Provisional application No. 62/081,850, filed on Nov. 19, 2014.

(51) Int. Cl.
*C04B 35/58* (2006.01)
*C04B 35/5831* (2006.01)
(Continued)

(52) U.S. Cl.
CPC ...... *C04B 35/5831* (2013.01); *C04B 35/6261* (2013.01); *C04B 35/6264* (2013.01);
(Continued)

(58) Field of Classification Search
CPC . C04B 35/5831; C04B 35/64; C04B 35/6262; C04B 35/62884; C04B 35/62897; C04B 35/645; C22C 26/00
See application file for complete search history.

(56) References Cited

U.S. PATENT DOCUMENTS

| 3,918,391 A | 11/1975 | De Vries et al. |
| 5,512,235 A | 4/1996 | Ceruti et al. |

(Continued)

FOREIGN PATENT DOCUMENTS

| EP | 2559504 A1 | 2/2013 |
| WO | 2007049140 A2 | 5/2007 |

*Primary Examiner* — Noah S Wiese

(57) ABSTRACT

Multi-step milling processes to prepare cBN composite powder forms a first powder mixture by adding a binder and a first cBN component, mills the first powder mixture for a first time period, combines a second cBN component with the milled first powder mixture to form a second powder mixture, and mills the second powder mixture for a second time period (less than the first time period) to form the cBN composite powder. A ratio of the D50 value of the second cBN component to the D50 value of the first cBN component is at least 3.0. Two-step milling with different milling times for the two cBN component fractions controls the amount of mill debris in the cBN composite powder mixture. Further processing of the cBN composite powder under HPHT conditions forms a cBN-based ceramic with an average value of a cBN particle free diameter of less than 2.0 microns.

36 Claims, 12 Drawing Sheets

(51) Int. Cl.
*C04B 35/626* (2006.01)
*C04B 35/63* (2006.01)
*C04B 35/645* (2006.01)

(52) U.S. Cl.
CPC ........ *C04B 35/6303* (2013.01); *C04B 35/645* (2013.01); *C04B 2235/386* (2013.01); *C04B 2235/3847* (2013.01); *C04B 2235/3886* (2013.01); *C04B 2235/402* (2013.01); *C04B 2235/405* (2013.01); *C04B 2235/5436* (2013.01); *C04B 2235/5445* (2013.01); *C04B 2235/5472* (2013.01); *C04B 2235/656* (2013.01); *C04B 2235/80* (2013.01)

(56) References Cited

U.S. PATENT DOCUMENTS

| | | | |
|---|---|---|---|
| 6,919,040 B2 | 7/2005 | Fries et al. | |
| 7,572,174 B2 | 8/2009 | Morita et al. | |
| 7,867,438 B2 | 1/2011 | Can et al. | |
| 7,932,199 B2 | 4/2011 | Mchale, Jr. et al. | |
| 8,105,966 B2 | 1/2012 | Dahl et al. | |
| 8,148,282 B2 | 4/2012 | Kountanya et al. | |
| 8,236,411 B2 | 8/2012 | Waki et al. | |
| 8,318,082 B2 | 11/2012 | Can et al. | |
| 8,382,868 B2 | 2/2013 | Goudemond et al. | |
| 8,673,435 B2 | 3/2014 | Kudo et al. | |
| 9,028,575 B2 * | 5/2015 | Bao | B01J 3/062 51/307 |
| 9,346,716 B2 * | 5/2016 | Okamura | C04B 35/5831 |
| 2008/0302023 A1 * | 12/2008 | Goudemond | B24D 3/06 51/309 |

* cited by examiner

METHOD OF PREPARING A MULTIMODAL CUBIC BORON NITRIDE POWDER

CROSS-REFERENCE TO RELATED APPLICATIONS

None This application is a § 371 National Stage Application of PCT International Application No. PCT/US2015/061292 filed Nov. 18, 2015 claiming priority of U.S. Application No. 62/081,850, filed Nov. 19, 2014.

TECHNICAL FIELD AND INDUSTRIAL APPLICABILITY

The present disclosure relates generally to cutting tools, and specifically to cutting tool inserts including cubic boron nitride (cBN)-based ceramics. In addition, the present disclosure relates to a method of production of cubic boron nitride composites for manufacturing into cutting tool inserts using a blend of ceramic powders with a multimodal particle size distribution of cBN, where the cBN raw material of at least two different particle size distributions are blended in a step-wise manner from the finest fraction to the coarser fraction and an amount of mill debris is controlled by adjusting the milling time applied to the coarser cBN.

In conventional methods, cBN powders are first blended with ceramic powders, such as TiN, TiCN, and metallic powders, such as aluminum and titanium alumide, by blending in a mill or ultrasonically in a slurry. Ideally, cBN particles are uniformly dispersed in the matrix formed by the binder phase materials, i.e., the ceramic and metallic powders. However, for powders with fine cBN, such as particles smaller or equal to 6 microns, ultrasonic techniques may not provide sufficient dispersion. Milling is the most effective method to achieve uniform dispersion.

Milling, in general, as a means of comminution and dispersion, is well known in the art. Commonly used milling techniques in grinding ceramic powder include conventional ball mills, tumbling ball mills, planetary ball mills, attritor mills, and agitated ball mills. Basic elements in the process include a mill jar, milling media, and a rotation element. The milling may be dry or wet, in which case the mixture includes a milling vehicle such as alcohol. Material to be milled is typically placed in the mill jar and exposed to the milling media and milled by the physical contact of the material with the milling media and mill jar. As used herein, the term "mill debris" refers to any materials produced from milling media or the linings of a mill due to the friction between abrasive particles, milling bodies and linings. There are many factors that determine the amount of mill debris including milling media size and density, jar size, and the slurry viscosity. Mill debris normally increases with milling time, cBN particle size, and milling speed.

In general, cBN-based ceramics are sintered under high-pressure high-temperature (HPHT) conditions. A cBN composite powder blend is first loaded in a refractory capsule together with or without a support structure, which is generally hard metal like cemented carbide, as applicable. Several such capsules are usually compiled into a high pressure cell core. During the HPHT process the material is subjected to pressures of at least 4 GPa, and temperatures of at least 1300° C. (see, for example, U.S. Pat. No. 5,512,235, the entire contents of which is incorporated herein by reference). Under these conditions, the cBN composite powder blend is sintered to full density, and the support structure, if present, at least becomes soft due to melting of cobalt in the support structure and attaches to the sintered cBN composite.

CBN has wide commercial applications in machining tools and has been used, variously, as abrasive particles in grinding products and as cutting tools in the form of a cBN composite. Typically, a cBN composite is used by bonding directly to a tool body, for example by brazing.

The cutting performance of cBN cutting tools can be influenced by, among other things, characteristics of the cBN powder mixtures, i.e., cBN particles and binder phase particles, which are used in the HPHT process. Examples of performance influencing characteristics of the cBN powder mixtures include cBN particle size (and size relative to a particle size of the binder phase), cBN particle size distribution and dispersion of cBN particles in the binder. Often, specific performance goals for a cBN cutting insert are a balance among these characteristics. The use of bimodal blends of cBN particle sizes is desired for improving cutting tool performance by increasing both wear resistance and toughness.

Conventionally in the milling process, cBN and binder raw material powders are milled together in a single step. There are also cases when binder raw materials are milled first to reduce the particle sizes before cBN powder is blended in the mixture. When cBN powders are milled together with binder powders, the milling speed is set to a level to promote uniform blending of cBN with the binder particles, rather than breaking down the cBN particle size, which requires much higher milling speed than for the purpose of blending. CBN particle breaking down in blending with binder is not desired because there is no good control of cBN particle shape and size distribution in this process. The desired shape and size distribution of cBN particles are normally achieved through the cBN powder raw material production processes.

CBN based cutting tool materials can be divided into two categories based upon cBN content. High cBN content materials, generally greater than 70 weight percent (wt %) cBN, are used in applications where high abrasive resistance and or high toughness are required. In these materials the high content of cBN adds abrasive resistance and strong cBN to cBN bonding adds toughness. Low cBN content materials, generally less than 70 wt % are used in applications where thermal and/or chemical resistance are required. Here, there is much less cBN to cBN bonding and the binder phase, the non-cBN components of the material, play critical role in the thermal and chemical resistance of the material. In these materials the composition of the binder and the dispersion of the cBN in the binder are critical to the performance of the material.

A binder powder with particle sizes that are significantly smaller than those of the cBN powder is desired because the cBN particles can be more closely packed and more evenly distributed in the cBN composite powder, as well as throughout the cBN-based ceramic when formed from such powders. However, there are drawbacks with the conventional milling process for the production of cBN-binder mixture when cBN has multimodal particle size distribution. Because cBN is much harder than the milling bodies, more wear occurs on milling bodies and the larger cBN particles determine the minimum space between the milling bodies. FIG. 1 depicts some of the difficulties of milling cBN blends with a multimodal size distribution. Firstly the larger cBN particles prevent the ceramic binder particles from being reduced in size. Particles smaller than the larger cBN particles are protected by the cBN from being milled smaller. Secondly, because fine cBN particles typically tend to agglomerate together, if the space between the milling bodies is not small enough to provide shear force on the fine cBN agglomerates, the agglomerates cannot be broken up, and the fine cBN particles cannot be well dispersed. In some cases, dispersion of cBN particles in binder can be improved by increasing milling time. However, milling time is limited by the desired amount of mill debris, and therefore the level of dispersion of cBN is also limited.

Examples of representative cBN processing are disclosed in U.S. Pat. Nos. 7,572,174; 7,867,438; 8,318,082; 8,382,868 and 8,673,435.

SUMMARY

For low cBN content materials, it would be beneficial to achieve good dispersion in the cBN-binder mixture while also controlling the amount of mill debris in the formed powder mixture.

In one embodiment, a method of preparing a cBN composite powder in a multi-step milling process with controlled milling debris production includes forming a first powder mixture by adding one or more binder component materials and a first cBN component to milling equipment and milling the first powder mixture for a first milling time. The method also includes combining a second cBN component with the milled first powder mixture to form a second powder mixture and milling the second powder mixture for a second milling time to form the cBN composite powder, where the second milling time is less than the first milling time. A ratio of the D50 value of the second cBN component to the D50 value of the first cBN component is at least 3.

In another embodiment, a method of forming a cBN-based ceramic from a cBN composite powder that is prepared in a multi-step milling process with controlled milling debris production includes forming a first powder mixture by adding one or more binder component materials and a first cBN component to milling equipment and milling the first powder mixture for a first time period. The method also includes combining a second cBN component with the milled first powder mixture to form a second powder mixture and milling the second powder mixture for a second time period to form the cBN composite powder. The method further includes forming a cBN-based ceramic by subjecting the cBN composite powder to a HPHT process. The first cBN component has a first D50 value and the second cBN component has a second D50 value, where a ratio of the second D50 value to the first D50 value is at least 3. The cBN-based ceramic has an average value of cBN particle free diameter of less than 2.0 microns, preferably less than 1.5 micron, more preferably less than 1.0 micron, and most preferably less than 0.90 micron.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
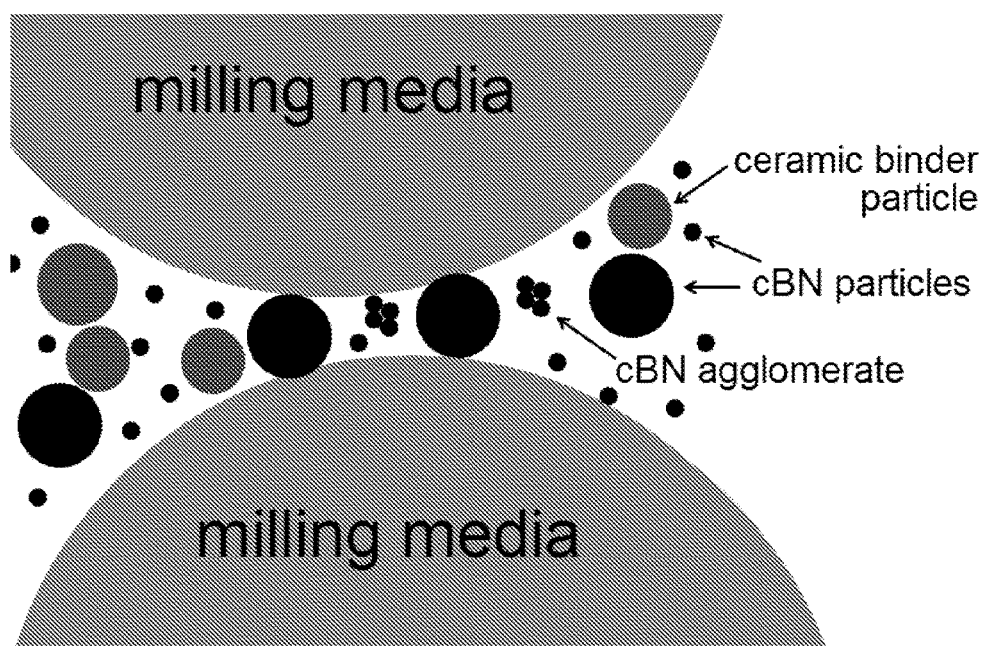
FIG. 1 depicts how large cBN particles can inhibit the dispersion of smaller cBN particles and milling ceramic binder phase particles by keeping the milling media separated.
Figure 2A:
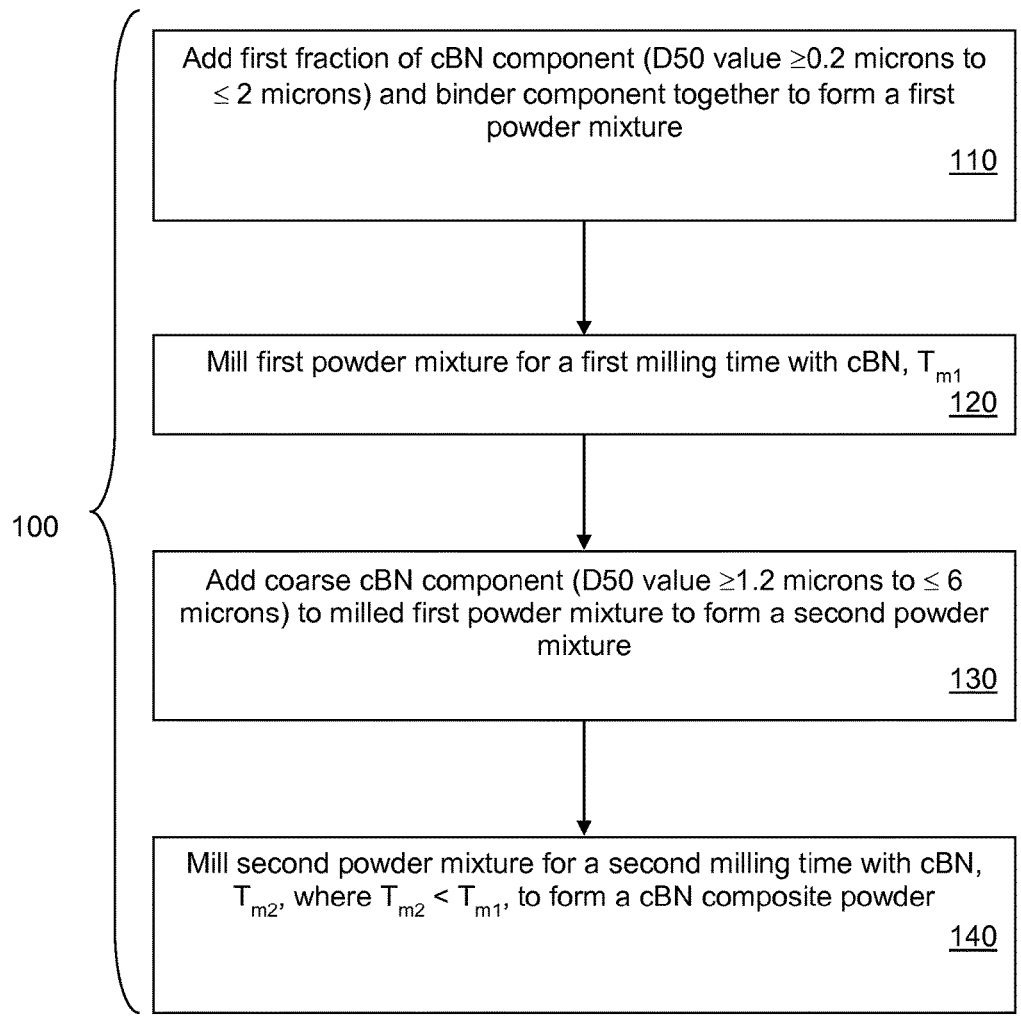
FIGS. 2A and 2B are graphical schematics of two exemplary methods to improve distribution of a fine binder component in a multimodal distribution of cubic boron nitride while controlling the addition of mill debris.
Figure 2B:
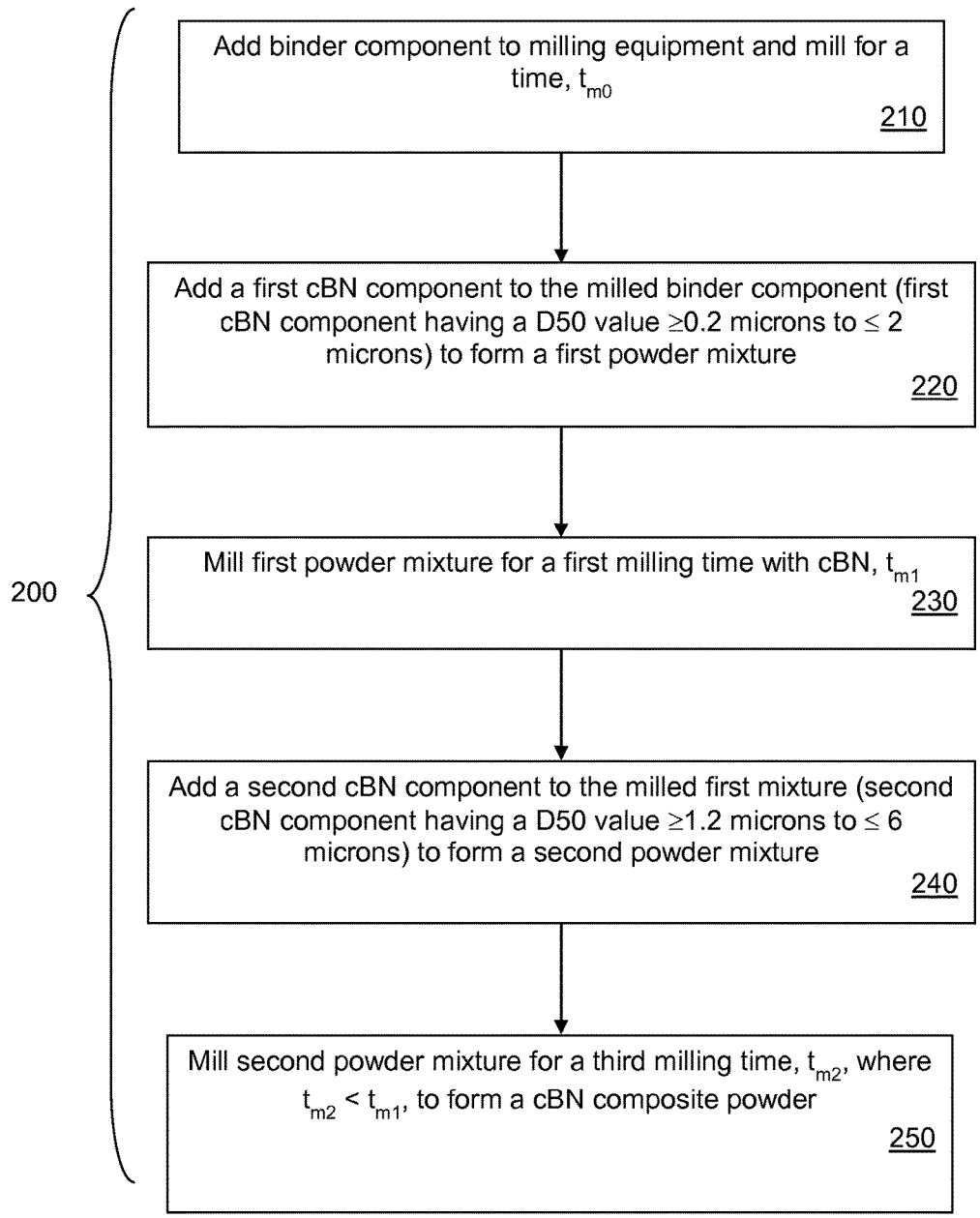

FIGS. 2A and 2B are graphical schematics of exemplary methods to improve the dispersion of a multimodal particle size distribution of cubic boron nitride (cBN) in a cBN composite blend while controlling the addition of mill debris. In exemplary methods, at least two fractions of the cBN component having different D50 values are added to the milling equipment at separate times and cumulatively milled with a binder component to form a cBN composite powder blend with a multimodal particle size distribution of cBN. The two-step addition of cBN powders with different D50 values (a fine powder with a first D50 value ($D50_1$) added first, followed by a coarser powder with a second D50 value ($D50_2$), where $D50_1$ is smaller than $D50_2$) improves the dispersion of fine cBN particles, limits the cumulative milling time of the coarser particles and provides freedom to control of the amount of mill debris produced in the milling operation. The cBN composite powder formed by exemplary methods can then be used in any subsequent process, such as HPHT sintering, to form a cBN-based ceramic.

Particle sizes disclosed and reported herein are measured by a laser diffraction analyzer, such as a Microtrac 3500 commercially available from Microtrac, a division of Nikkiso America, Inc. Powders reported herein may be described according to the statistical distribution of their diameters "D-values." A D-value represents the volume division diameter of the particles being measured. The D-value value represents the diameter at which, when all particles in a sample are arranged in order of ascending volume, divides the sample's volume into specified percentages. The percentage volume below the recited diameter of interest is the number expressed after the "D". For example the value of D10 is the diameter at which 10% of a sample's volume is comprised of smaller particles; the D50 value is the diameter at which 50% of a sample's volume is comprised of smaller particles; and the D90 value is the diameter at which 90% of a sample's volume is comprised of smaller particles. "D-values" are reported herein to tenth of micron precision.

Figure 3:
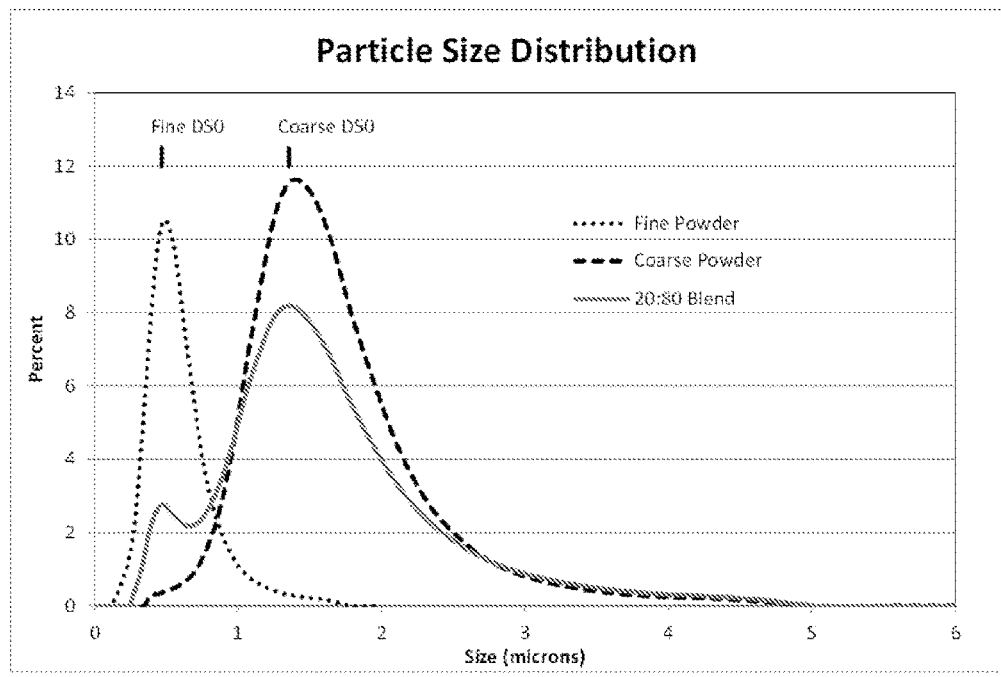
FIG. 3 shows example distributions of particle sizes for a bimodal cBN blend.

FIG. 3 shows an example distribution of particle sizes for a bimodal cBN blend composed of two powders. 20% of the blend was made from powder with a D50 of 0.5 micron and the remaining 80% is from a powder with a D50 of 1.4 micron.

A first exemplary method is shown in FIG. 2A. In the first exemplary method 100, a first fraction of the cBN component is added to a binder component to form a first powder mixture 110. The cBN component in the first fraction has a fine grain size, meaning it has a D50 value equal to or greater than 0.2 micron to less than or equal to 2.0 microns. Alternatively, the D50 value of the fine cBN component can be equal to or greater than 0.3 micron, equal to or greater than 0.4 micron, equal to or greater than 0.5 micron or equal to or greater than 0.6 micron to less than or equal to 1.6 micron, less than or equal to 1.3 micron or less than or equal to 1.0 micron. Preferably, the cBN component in the first fraction has a D50 value in the range of 0.2 to 1.0 micron, inclusive.

The first powder mixture can be created directly in the milling equipment. Alternatively, the first powder mixture can be created by adding together the constituents of the first powder mixture in separate equipment and then adding the combined constituents to the milling equipment. Combinations of these methods can also be used.

The first powder mixture is then milled in milling equipment, such as an attritor mill with cermet milling media of (Ti,W)CN—Co, for a first milling time with cBN, $T_{m1}$, 120. Examples of times for $T_{m1}$ include 1 hour to 24 hours, alternatively at least 2 hours, at least 6 hours or at least 10 hours up to 12 hours or 16 hours. The time $T_{m1}$ is suitable to reduce the D50 value of the binder component at least 50%, alternatively reduced at least 80% or reduced 90% and can be selected by reference to calibration curves of binder particle size as a function of time. The calibration curves are determined from control experiments in which the binder component is milled in the mill (without other components) and the D50 value is periodically measured as a function of milling time and then plotted to make the calibration curves. However, because the size of cBN particles are essentially not reduced by milling, when the binder component is milled in the presence of cBN particles, the size of the cBN particles influences the lower limit of the size to which the binder component can be milled. Accordingly, selection of the time $T_{m1}$ should also take this lower limit into account, since after reaching such a lower limit, additional milling has minimal effect on the D10 value of the binder component, but will continue to contribute mill debris to the powder.

Subsequent to milling for the first milling time with cBN, a second fraction of the cBN component is added to the milled first powder mixture to form a second powder mixture 130. The cBN component in the second fraction has a coarse grain size, meaning it has a D50 value equal to or greater than 1.2 micron to less than or equal to 6.0 microns. Alternatively, the D50 value of the coarse cBN component can be equal to or greater than 1.6 micron, equal to or greater than 2.0 microns, equal to or greater than 2.5 microns or equal to or greater than 3.0 microns to less than or equal to 5.0 microns, less than or equal to 4.0 microns, less than or equal to 3.0 microns or less than or equal to 2.0 microns. Preferably, the cBN component in the second fraction has a D50 value in the range of 1.0 and 5.0 microns, inclusive.

The second powder mixture can be created directly in the milling equipment by adding the second fraction of the cBN component directly to the milling equipment containing the milled first powder mixture. Alternatively, the second powder mixture can be created by adding together the constituents of the second powder mixture in separate equipment and then adding the combined constituents to the milling equipment. Combinations of these methods can also be used.

The second powder mixture is then milled in milling equipment, such as an attritor mill with cermet milling media of (Ti,W)CN—Co, for a second milling time with cBN, $T_{m2}$, to form a cBN composite powder 140. The amount of mill debris increases with milling time. The time $T_{m2}$, is determined based on the desired level of mill debris that will form during the milling process and the time required for mixing. The amount of mill debris generated by fine cBN particles is far less than that generated by coarser cBN particles, and therefore time $T_{m1}$ can be significantly longer than time $T_{m2}$. In exemplary embodiments, the time $T_{m2}$ varies between 15 minutes and 7 hours. Typically, the amount of mill debris generated in the first milling step is less than 30% of the total mill debris. The total mill debris may range from 3 wt % to 25 wt % of the powder. The amount of elements from the mill debris will be incorporated into the final composition.

A second exemplary method is shown in FIG. 2B. In the second exemplary method 200, a binder component is added to milling equipment, such as an attritor mill with cermet milling media of (Ti,W)CN—Co, and premilled for a period of time, $t_{m0}$, 210. Premilling of the binder component both reduces the D50 value of the binder component and makes the size distribution narrower. The binder component before premilling 210 typically has an D50 value of 3.0 to 4.0 microns and a size distribution where the D10 value is 1.0 micron and the D90 value is 10 microns; after milling 210, the binder component has a D50 value of 0.3 to 0.4 micron and a size distribution where the D10 value is 0.2 micron and the D90 value is 1.0 micron. Ceramic binders, such as TiN and TiCN are much softer than cBN and, therefore, generate much less mill debris for the same milling time. Thus, the time $t_{m0}$ can be selected to attain the desired D50 value and size distribution of the binder component with a controlled level of mill debris.

A first fraction of cBN component is then added to the premilled binder component to form a first powder mixture 220. The cBN component in the first fraction has a fine grain size, meaning it has a D50 value equal to or greater than 0.2 micron to less than or equal to 2.0 microns. Alternatively, the D50 value of the fine cBN component can be equal to or greater than 0.3 micron, equal to or greater than 0.4 micron, equal to or greater than 0.5 micron or equal to or greater than 0.6 micron to less than or equal to 1.6 micron, less than or equal to 1.3 micron or less than or equal to 1.0 micron. Preferably, the cBN component in the first fraction has a D50 value in the range of 0.2 to 1.0 micron, inclusive.

The first powder mixture can be created directly in the milling equipment. Alternatively, the first powder mixture can be created by adding together the constituents of the first powder mixture in separate equipment and then adding the combined constituents to the milling equipment. Combinations of these methods can also be used.

The first powder mixture is then milled in milling equipment, such as an attritor mill with cermet milling media of (Ti,W)CN—Co, for a first milling time with cBN, $t_{m1}$, 230. The time $t_{m1}$ should be suitable to break up the agglomerates of the fine cBN particles and produce a uniform distribution of fine cBN particles in the ceramic powder matrix. Examples of times for $t_{m1}$ include 1 hour to 24 hours, alternatively at least 2 hours, at least 6 hours or at least 10 hours up to 12 hours or 16 hours.

The time $t_{m1}$ can be selected by reference to calibration curves of binder particle size as a function of time. The calibration curves are determined from control experiments in which the binder component is milled in the mill (without other components) and the D50 value is periodically measured as a function of milling time and then plotted to make the calibration curves. However, because the size of cBN particles are essentially not reduced by the milling, when the binder component is milled in the presence of cBN particles, the size of the cBN particles influences the lower limit of the size to which the binder component can be milled. Accordingly, selection of the time $t_{m1}$ should also take this lower limit into account, since after reaching such a lower limit, additional milling has minimal effect on the D10 value of the binder component, but will continue to contribute mill debris to the powder. Subsequent to milling for the first milling time with cBN, a second fraction of the cBN component is added to the milled first powder mixture to form a second powder mixture 240. The cBN component in the second fraction has a coarse particle size, meaning it has a D50 value equal to or greater than 1.2 micron to less than or equal to 6.0 microns. Alternatively, the D50 value of the coarse cBN component can be equal to or greater than 1.6 micron, equal to or greater than 2.0 microns, equal to or greater than 2.5 microns or equal to or greater than 3.0 microns to less than or equal to 5.0 microns, less than or equal to 4.0 microns, less than or equal to 3.0 microns or less than or equal to 2.0 microns. Preferably, the cBN component in the second fraction has a D50 value in the range of 1.0 to 5.0 microns, inclusive.

The second powder mixture can be created directly in the milling equipment by adding the second fraction of the cBN component directly to the milling equipment containing the milled first powder mixture. Alternatively, the second powder mixture can be created by adding together the constituents of the second powder mixture in separate equipment and then adding the combined constituents to the milling equipment. Combinations of these methods can also be used.

The second powder mixture is then milled in milling equipment, such as an attritor mill with cermet milling media of (Ti,W)CN—Co, for a second milling time with cBN, $t_{m2}$, to form a cBN composite powder 250. The amount of mill debris increases with milling time. The time $t_{m2}$ is determined based on the desired level of mill debris that will form during the milling process and the time required for mixing. The amount of mill debris generated by fine cBN particles is far less than that generated by coarser cBN particles, and therefore the time $t_{m1}$ can be significantly longer than the time $t_{m1}$. In exemplary embodiments, the time $t_{m2}$ varies between 15 minutes and 7 hours. Typically, the amount of mill debris generated in the first milling step with cBN is less than 30% of the total mill debris. The total mill debris may range from 3 wt % to 25 wt % of the powder. The amount of elements from the mill debris will be incorporated into the final composition.

While the amount of first fraction of cBN component and second fraction of cBN component can vary based on the desired contents of the cBN composite powder to be formed, exemplary methods disclosed herein use cBN components in respective fractions such that a ratio of the D50 value of the coarsest and the D50 value of finest cBN components in the fractions is at least 3. Alternatively, the ratio is at least 4 and up to 6 or up to 10. Specific examples of the size ratios for the cBN components are further disclosed in the examples. For a bimodal distribution, the ratio of D50 values is determined by comparing the value in the fraction with the larger D50 to the value in the fraction with the smaller D50. For a system with more than two fractions of cBN components, i.e., in a multi-modal system, the ratio of D50 value is determined by comparing the value in the fraction with the largest D50 to the value in the fraction with the smallest D50.

Also, it should be understood that the amount of mill debris increases, in some cases significantly, with blending speed, blending time, and cBN particle size. Thus, the blending speed, milling times, and the D50 value of the cBN component used and disclosed herein should be selected to control the amount of mill debris as disclosed herein. Preferably the amount of mill debris when using (Ti,W)CN—Co cermet milling media is between 15 and 25 wt %. Preferably the amount of mill debris when using cemented carbide milling media is between 2 and 5 wt %.

In the process outlined above and in FIGS. 2A and 2B only two cBN powder distributions were added. It is envisioned that the process can be extended to more powder distributions. One way is to add two or more powders in one step. For example, a powder with a D50 value of 0.5 micron and a powder with a D50 value of 1.4 micron could both be added in steps 110 or 220. Then a powder with a D50 value of 4.2 microns could be added in steps 130 or 240. Likewise, two or more powders could be added in steps 130 or 240. A second way to add the multiple distributions is to add additional milling steps. For example a powder with a D50 value of 0.5 micron could be added in step 110, a powder with a D50 value of 1.4 micron could be added in step 130, and then a powder with a D50 value of 4.2 microns could be added in an additional step, i.e. an n-th step. This mixture would then be milled for an additional time, $T_{mn}$ or $t_{mn}$, based on the same principles as disclosed herein for $T_{m2}$ or $t_{m2}$.

Further, in the process outlined herein, the cBN is present in the milled second powder mixture in an amount between 5 and 70 wt %. The composition of the cBN component, in terms of the amount of first cBN component (i.e, the fine cBN component) and second cBN component (i.e., the coarse cBN component), can vary. In exemplary embodiments, the ratio of the mass of the first cBN component to the mass of the second cBN component is in a range from 0.04 to 2.0. Preferably, the ratio of the mass of the first cBN component to the mass of the second cBN component is less than 0.11, which may be used, for example, in cBN cutters in which high impact resistance is desired. Alternatively, the ratio of the mass of the first cBN component to the mass of the second cBN component is greater than 1.0, which may be used, for example, in cBN cutters in which high wear resistance is desired.

Figure 4:
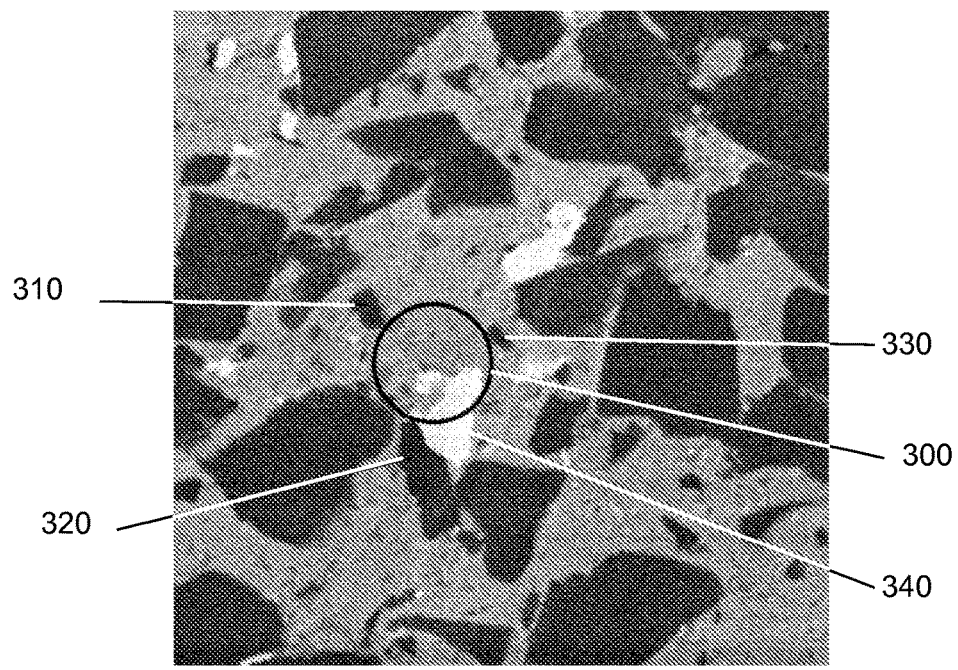
FIG. 4 illustrates an area used to quantify the dispersion by measuring the regions with no cBN particles.

The dispersion of the binder component can be quantified by measuring the regions in the cBN-based ceramic with no cBN particles. The dispersion is measured by subdividing SEM images of the fully sintered material into regions with widths 3 to 4 times the D50 value of the coarse cBN component. In each region the largest circle containing no cBN (i.e., only containing binder phase) is identified and the diameter of the largest circle measured. This largest circle is called the cBN particle free circle and its associated diameter is called the cBN particle free diameter. FIG. 4 is an example of an SEM image in which a region with no cBN has had a cBN particle free circle 300 superimposed. Note that the cBN particle free circle 300 extends to the greatest extent between cBN particles (in black) 310, 320, 330. The white particle 340 is mill debris. The value of the cBN particle free diameter defines an effective binder size. 30 to 60 regions of SEM images are analyzed and the average and standard deviation of the cBN particle free diameters for all of the regions are determined and reported. In general, the larger the cBN size, the larger the cBN particle free diameter. Also, the higher the ratio of the binder to cBN volume, the larger the cBN particle free diameter. For two materials with the same ratio of binder to cBN and the same cBN particle size distribution, lower values of average cBN particle free diameter and standard deviation of the cBN particle free diameters indicate a better dispersion. Likewise, in general, the larger the value of the cBN particle free diameter and standard deviation of the cBN particle free diameters, the poorer the dispersion. Using the above quantifying method, exemplary embodiments of the methods disclosed herein result in an average value for cBN particle free diameter of less than 2.0, alternatively 0.8 to 2.0 microns, with a standard deviation of 0.10 to 0.40 micron. Preferably, the average value of the cBN particle free diameter is less than 1.5 micron, more preferably less than 1.0 micron, and most preferably less than 0.90 micron; preferably, the standard deviation of the cBN particle free diameter is less than 0.35 micron, more preferably less than 0.30, even more preferably less than 0.20, and most preferably less than 0.15 micron.

In all of the above disclosed methods, suitable binders include oxides, nitrides, and carbides of Group IV, V and VI elements of the periodic table and combinations. Example binders include TiN, TiC, Ti(C,N), ZrN, Co, Al, and mixtures thereof. Preferably the binder is or includes substoichiometric components, e.g., substoichiometric TiN (ssTiN), substoichiometric TiC (ssTiC) and substoichiometric TiCN (ssTiCN). In addition, other components can be included in the binder component, for example the total blend may be up to 10 wt % Al, alternatively up to 5 wt % Al.

Further, although described as an attritor mill with cermet milling media of (Ti,W)CN—Co, alternative milling equipment can be used, such as ball mills and planetary mills. Milling media of other materials, such as cemented carbide, can also be used.

Comparative and inventive samples were made and investigated, as disclosed in the following section.

Example 1 (Comparative Example)

Substoichiometric (ss) TiN was milled in ethanol with cermet media of (Ti,W)CN—Co in an attritor mill for 12 hours at a speed of 200 RPM. The milling reduced the D50 of the ssTiN from 4.0 microns to 0.4 micron. A cBN component with a D50 of 1.4 micron and an aluminum powder (D50 of 0.2 micron) were added to the milled binder to make a composition of 51 wt % ssTiN, 43 wt % cBN, and 6 wt % Al. This composition was blended in the mill for another 7 hours at the same speed. After blending, the cermet media loss (representing the milling debris) was determined by measuring the difference in weight of the milling media before and after milling. The mill debris was 18 wt % in the final powder blend (including the raw powders added in the mill and the mill debris). This reduced the cBN content of the blend after milling from 43 wt % to 35 wt %. The slurry of the cBN composite blend was then mixed with a polyethylene glycol (PEG)-water solution and spray dried. The spray dried powder was then compacted into discs, fired at 400° C. in hydrogen to remove the PEG and then at 900° C. in vacuum to promote reactions between aluminum and ssTiN. The fired discs were loaded in containers of refractory metal and sintered at high pressure-high temperature (HPHT) conditions with temperature above 1300° C. and pressure above 4 GPa.

Figure 5A:
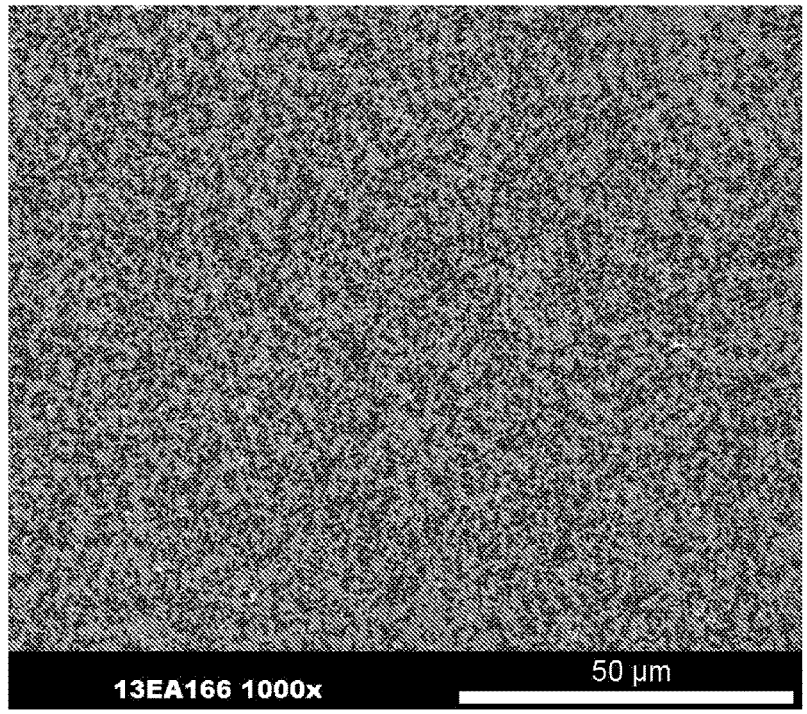
FIGS. 5A and 5B show the microstructure of Example 1 at low magnification (1000×) (FIG. 5A) and high magnification (10,000×) (FIG. 5B) as observed with scanning electron microscopy (SEM).
Figure 5B:
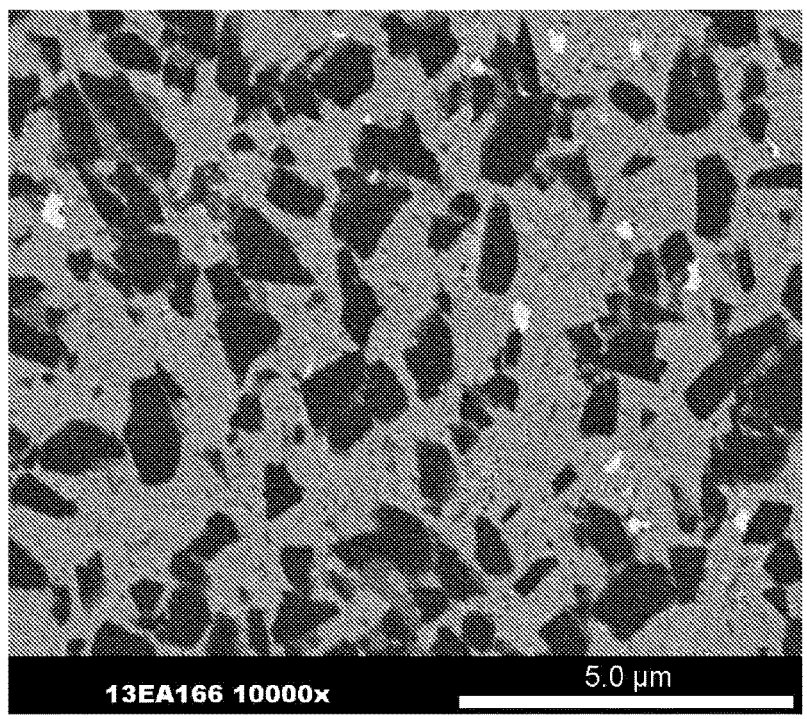

FIGS. 5A and 5B show the microstructure of Example 1 at low magnification (1000×) (FIG. 5A) and high magnification (10,000×) (FIG. 5B) as observed with scanning electron microscopy (SEM). With 7 hours of blending the cBN (D50 of 1.4 micron) with the binder, the average value of the cBN particle free diameter was 1.25 micron and the standard deviation was 0.26 micron.

Example 2 (Comparative Example)

The composition of Example 2 was the same as that of Example 1, except that 55 wt % of the total amount of cBN in Example 1 was replaced with fine cBN powder having a D50 of 0.5 micron, i.e., 23.6 wt % of cBN in the blend had a D50 of 0.5 micron. In this example, the ssTiN was first milled in ethanol with cermet media in an attritor mill for 16 hours to reduce the particle size of the ssTiN. Then the cBN powders with D50 values of 0.5 micron and 1.4 micron were added to the mill and blended for another 6 hours at the same speed. Aluminum powder with D50 of 0.2 micron was ultrasonically dispersed in ethanol and then mixed with the milled slurry. After blending, the mill debris was 17 wt % of the final powder blend, giving a final cBN content of 36 wt %. The slurry was then mixed with a polyethylene glycol (PEG)-water solution and spray dried, compacted, fired, and HPHT sintered as described in Example 1.

Figure 6A:
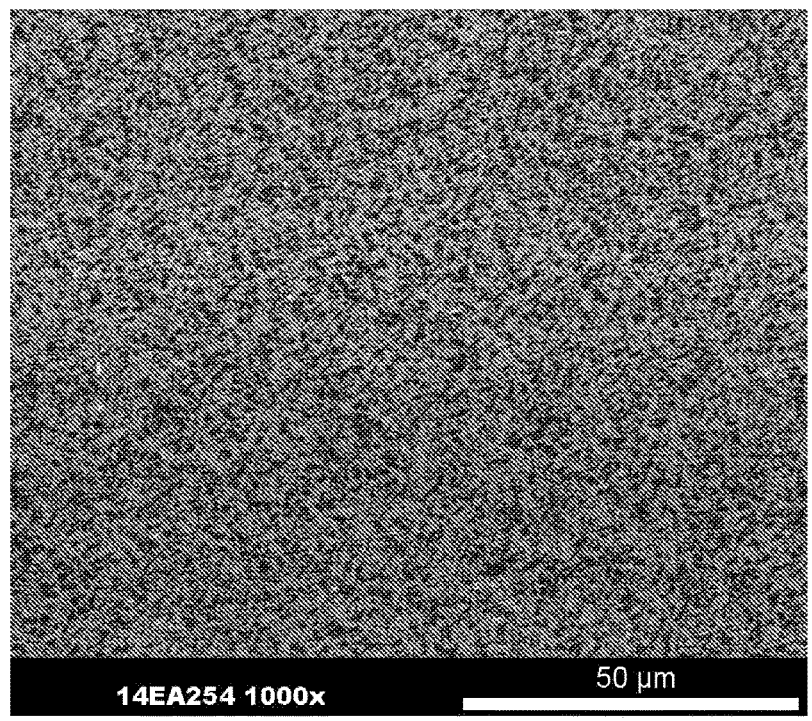
FIGS. 6A and 6B show the microstructure of Example 2 at low magnification (1000×) (FIG. 6A) and high magnification (10,000×) (FIG. 6B) as observed with SEM.
Figure 6B:
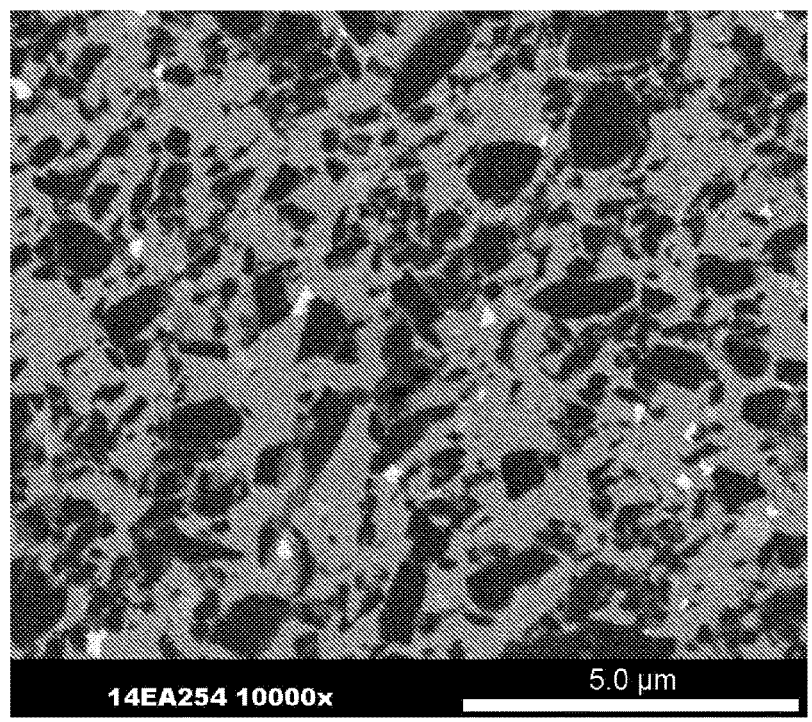

FIGS. 6A and 6B show the microstructure of Example 2 at low magnification (1000×) (FIG. 6A) and high magnification (10,000×) (FIG. 6B) as observed with scanning electron microscopy (SEM). With 6 hours of blending the binder with cBN powder having a bimodal distribution composed of powders with D50 values of 0.5 micron and 1.4 micron, the average value of the cBN particle free diameter was 0.94 micron and the standard deviation was 0.16 micron.

Example 3

The composition of Example 3 was the same as that of Example 2, but the cBN component was added in a two-step process. In this case the ssTiN and fine grain cBN powders with a D50 of 0.5 micron were milled in ethanol with cermet media in an attritor mill for 16 hours to reduce the particle size of ssTiN. Then, cBN powder with a D50 of 1.4 micron was loaded in the mill and blended for another 6 hours at the same speed. The aluminum powder was ultrasonically dispersed in ethanol and then mixed with the milled slurry. After blending, the mill debris was 17 wt % of the final blend, giving a final cBN content of 36 wt %. The slurry was then mixed with a polyethylene glycol (PEG)-water solution and spray dried, compacted, fired, and HPHT sintered as described in Example 1.

Figure 7A:
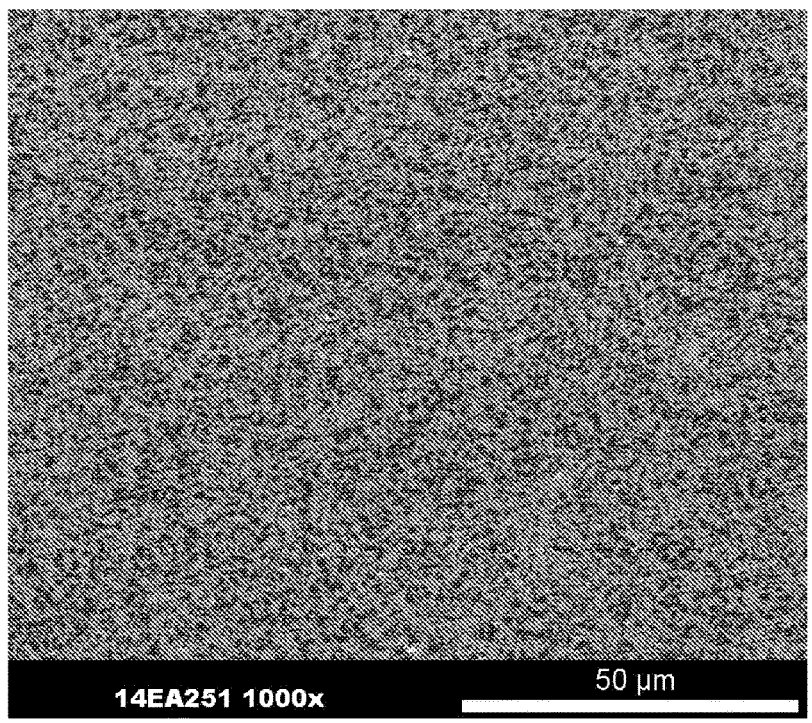
FIGS. 7A and 7B show the microstructure of Example 3 at low magnification (1000×) (FIG. 7A) and high magnification (10,000×) (FIG. 7B) as observed with SEM.
Figure 7B:
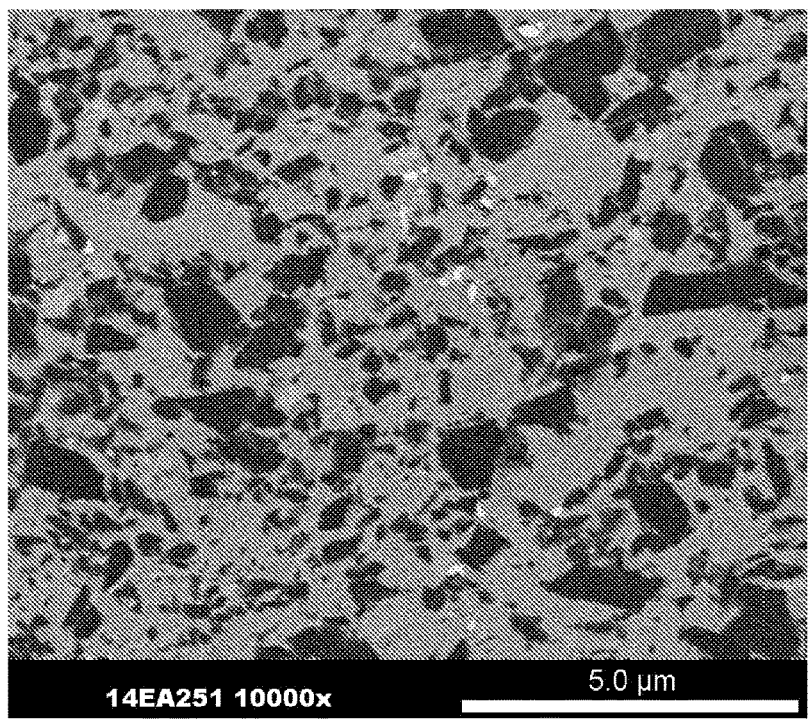

FIGS. 7A and 7B show the microstructure of Example 3 at low magnification (1000×) (FIG. 7A) and high magnification (10,000×) (FIG. 7B) as observed with scanning electron microscopy (SEM). With 16 hours of blending the binder with the cBN powder having a D50 of 0.5 micron, and 6 hours of blending with cBN powder having a D50 of 1.4 micron, the average value of the cBN particle free diameter was 0.84 micron and the standard deviation was 0.14 micron.

Examples 1 and 2 are comparable examples to Example 3. Example 1 contains only one cBN size. This results in a larger value of the cBN particle free diameter (1.2 micron). The addition of a second cBN size in Examples 2 and 3 decreases the binder size to 0.94 and 0.84 micron by allowing smaller particles in the spaces between the larger cBN particles. In example 2 the cBN powder with bimodal particle size distribution is milled in the conventional method resulting in a value of average cBN particle free diameter that is 0.10 micron larger than in Example 3. Even with 6 hours of milling, the fine component of the cBN in Example 2 tended to be clumped together and not well dispersed. Milling the fine particle size fraction of the cBN component with the TiN before adding the coarser cBN component, i.e., consistent with step 110 in FIG. 2A and demonstrated by Example 3, resulted in an improved dispersion of cBN as evidenced by the smaller value of the average cBN particle free diameter binder size (decrease from 0.94 to 0.84 micron), as well as the a lower standard distribution (decrease from 0.16 to 0.14 micron).

Examples 1-3 also show that, by milling the fine particle size fraction of the cBN component for additional time with the binder component, the amount of mill debris does not increase, but rather can be maintained at the same level. The additional milling has little effect on the mill debris both because of the small particle size and because of the low concentration of the fine cBN.

Example 4 (Comparative)

Substoichiometric (ss) TiN was milled with cemented carbide milling media in ethanol in an attritor mill for 2 hours to reduce particle size. During the last 15 minutes cBN powder was added to the mill. The cBN had a bimodal distribution and was composed of 20% 0.5 micron D50 powder and 80% 4.2 microns D50 powder. Aluminum powder was ultrasonically dispersed in ethanol and then mixed with the milled slurry to form a composition of 51 wt % cBN, 38 wt % ssTiN, 7 wt % Al, and 4 wt % cemented carbide mill debris. The slurry was dried, loaded into refractory metal containers, and sintered at HPHT conditions with a temperature above 1300° C. and pressure above 4 GPa.

Figure 8A:
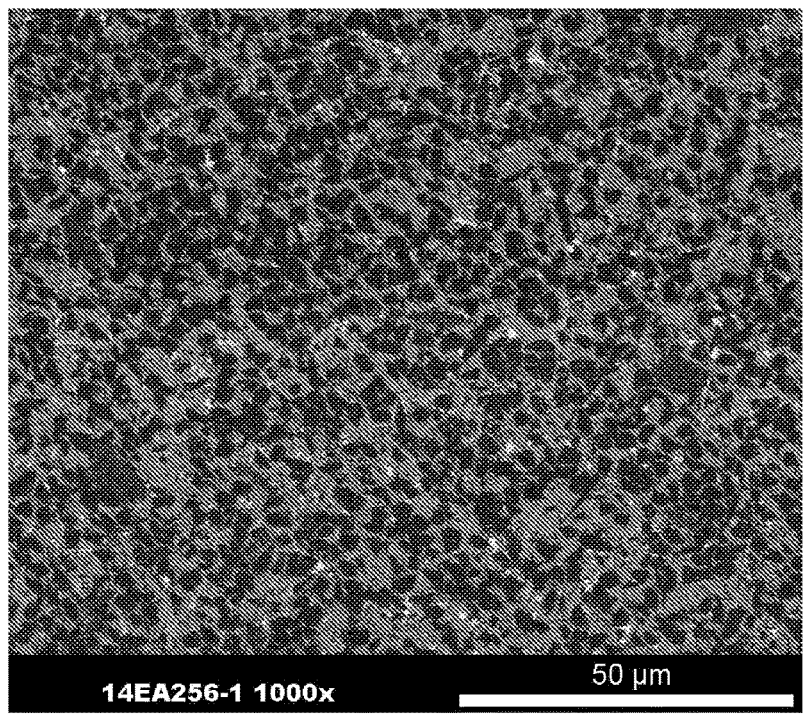
FIGS. 8A and 8B show the microstructure of Example 4 at low magnification (1000×) (FIG. 8A) and high magnification (10,000×) (FIG. 8B) as observed with SEM.
Figure 8B:
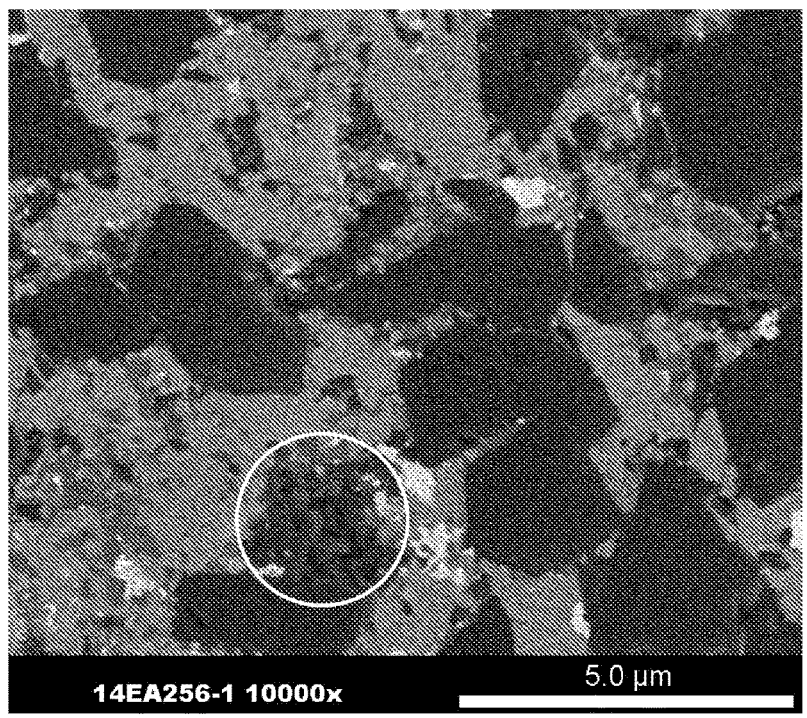

FIGS. 8A and 8B show the microstructure of Example 4 at low magnification (1000×) (FIG. 8A) and high magnification (10,000×) (FIG. 8B) as observed with scanning electron microscopy (SEM). With 15 minutes of final milling of binder with cBN with both 0.5 micron D50 powder and 4.2 microns D50 powder, the average value of the cBN particle free diameter was 2.1 microns and the standard deviation was 0.35 micron. The circle in FIG. 8B identifies an agglomerate of fine cBN particles that were not broken up in the milling process.

Example 5

Example 5 was prepared the same as Example 4, except that the 0.5 micron D50 cBN was milled with the ssTiN for the full 2 hours. During the last 15 minutes, the 4.2 microns D50 cBN powder was added to the mill. The Al powder was added, the slurry dried, and the material HPHT sintered as described in Example 4. The amount of mill debris was similar to Example 4 and resulted in the same final composition (51 wt % cBN, 38 wt % ssTiN, 7 wt. % Al, and 4 wt % cemented carbide mill debris).

Figure 9A:
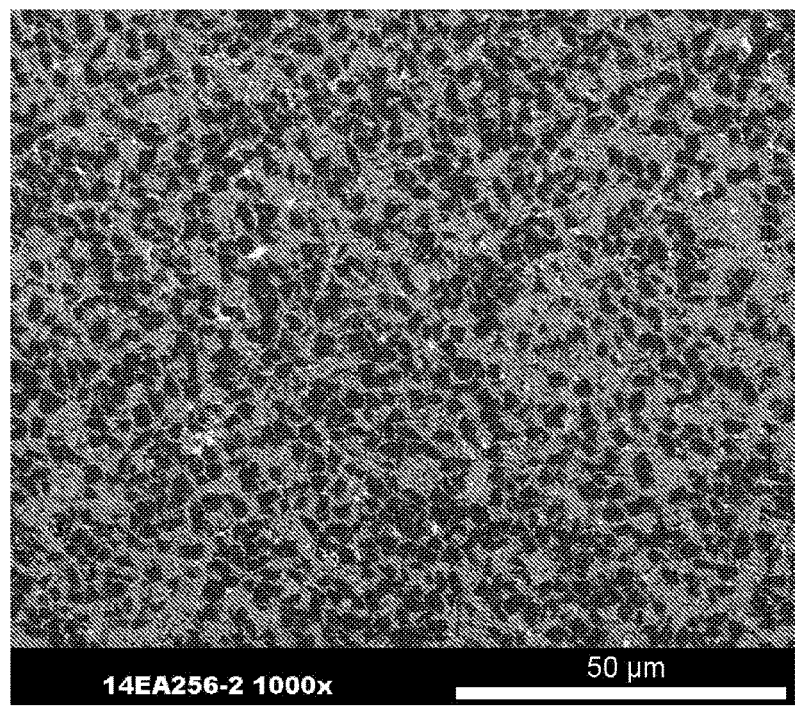
FIGS. 9A and 9B show the microstructure of Example 5 at low magnification (1000×) (FIG. 9A) and high magnification (10,000×) (FIG. 9B) as observed with SEM.
Figure 9B:
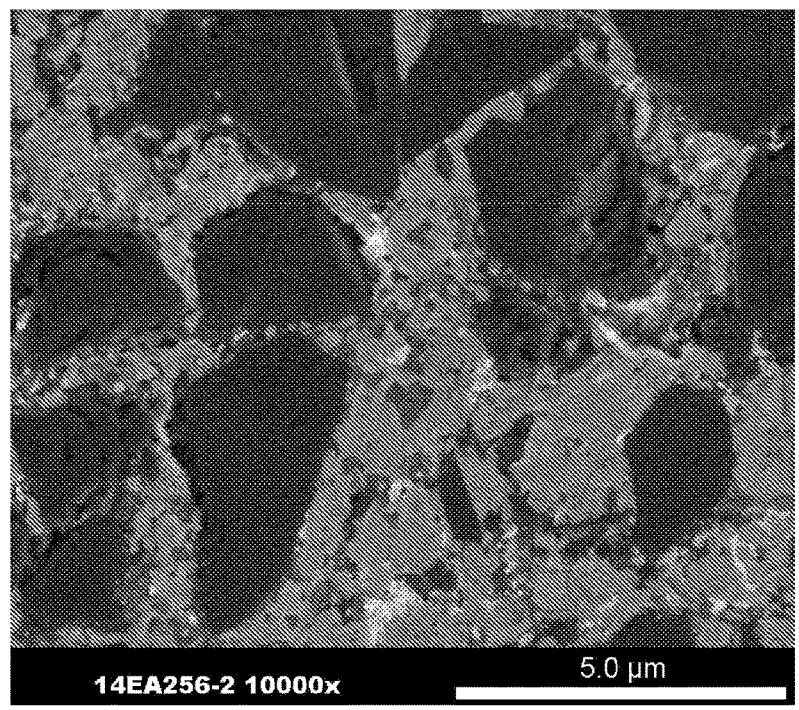

FIGS. 9A and 9B show the microstructure of Example 5 at low magnification (1000×) (FIG. 9A) and high magnification (10,000×) (FIG. 9B) as observed with scanning electron microscopy (SEM). With 2 hours of milling the binder with 0.5 micron (D50) cBN and 15 minutes of blending with 4.2 microns (D50) cBN, the average value of the cBN particle free diameter was 1.9 micron and the standard deviation was 0.35 micron.

Example 6 (Comparative)

Example 6 was the same as that of Example 4 except that all the cBN was milled with the ssTiN for the full 2 hours. The Al powder was added, the slurry dried, and the material HPHT sintered as described in Example 4. In this example the milling of the coarse component (4.2 microns D50) of the cBN for the full 2 hours resulted in additional mill debris and a final slurry composition of 43 wt % cBN, 32 wt % ssTiN, 6 wt. % Al, and 19 wt % cemented carbide mill debris.

Figure 10A:
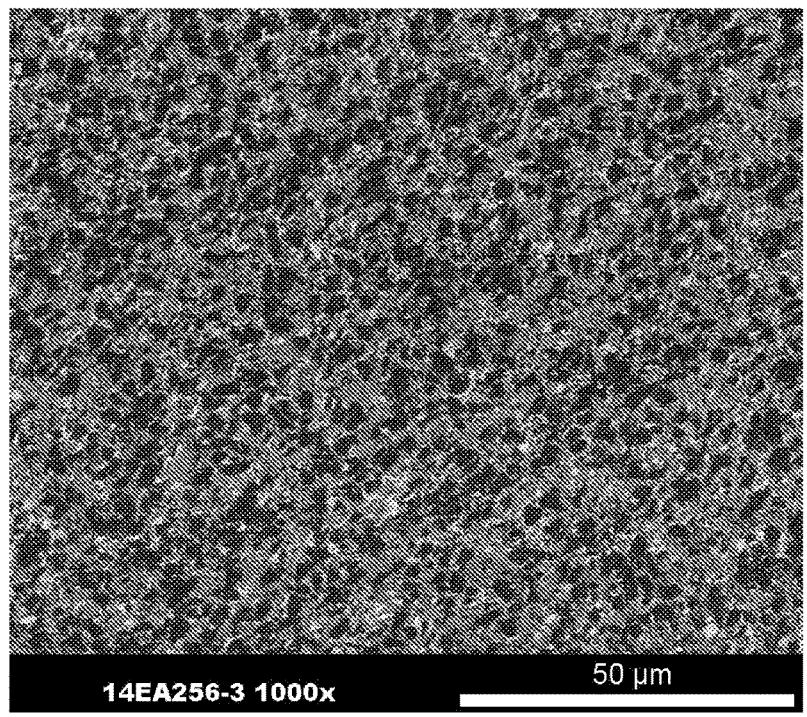
FIGS. 10A and 10B show the microstructure of Example 6 at low magnification (1000×) (FIG. 10A) and high magnification (10,000×) (FIG. 10B) as observed with SEM.
Figure 10B:
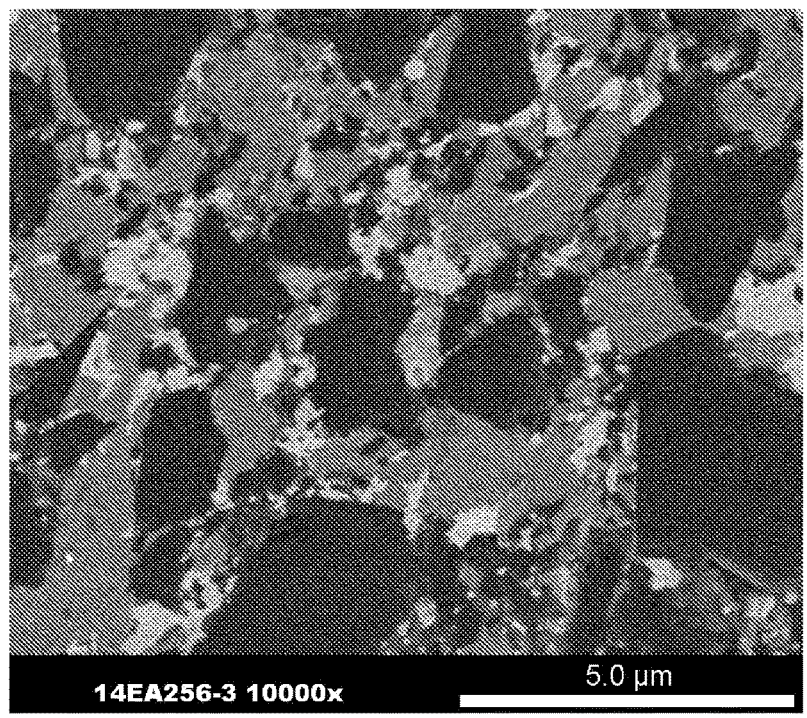

FIGS. 10A and 10B show the microstructure of Example 6 at low magnification (1000×) (FIG. 10A) and high magnification (10,000×) (FIG. 10B) as observed with scanning electron microscopy (SEM). With 2 hours of blending the binder with both 0.5 micron D50 cBN and 4.2 microns D50 cBN, the average value of the cBN particle free diameter was 1.7 micron and the standard deviation was 0.32 micron. The bright features in the SEM images are from the mill debris as identified as 340 in FIG. 4. Comparison of FIGS. 8B, 9B and 10B shows the significant increase in mill debris with the longer milling of the coarse cBN. The increased milling of the cBN did improve the dispersion as evidence by the decrease in the average value of the cBN particle free diameter, but this value was decreased by blending the excessive mill debris with fine cBN particles.

Example 7 (Comparative)

Substoichiometric TiCN and Al powder with a ratio (by weight) of 6.7:1 was ultrasonically mixed in ethanol, dried and reacted at 1100° C. This powder was wet milled in an ethanol/water mixture in an attritor mill with cemented carbide media for 6 hours to reduce particle size. Then cBN with a bimodal particle size distribution (95% having a D50 of 2.5 microns and 5% having a D50 of 0.5 micron) was added to the mill to create a composition of 54 wt % cBN and 46 wt % binder. This slurry was blended for an additional 15 minutes. The slurry was then mixed with polyethylene glycol (PEG)-water solution and spray dried. The spray dried powder was then compacted, fired, and HPHT sintered as described in Example 1.

Figure 11A:
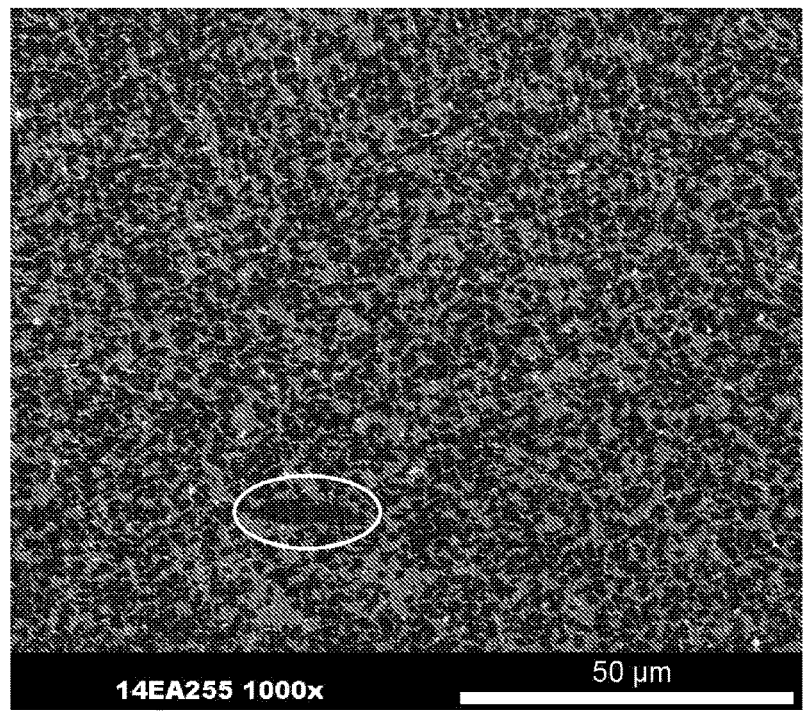
FIGS. 11A and 11B show the microstructure of Example 7 at low magnification (1000×) (FIG. 11A) and high magnification (10,000×) (FIG. 11B) as observed with SEM.
Figure 11B:
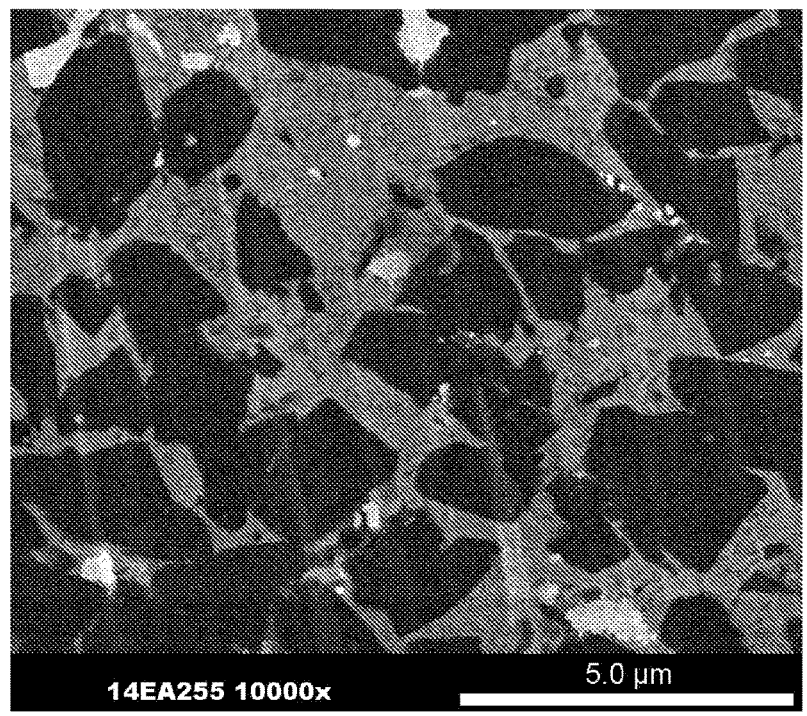

FIGS. 11A and 11B show the microstructure of Example 7 at low magnification (1000×) (FIG. 11A) and high magnification (10,000×) (FIG. 11B) as observed with scanning electron microscopy (SEM). With 15 minutes of blending the binder with the cBN having the noted bimodal distribution, the average value of the cBN particle free diameter was 1.7 micron and the standard deviation was 0.35 micron. In FIG. 11A, one can see a large agglomerate identified by the circle. Increased milling time or energy is required to break up these types of agglomerates.

Example 8

The composition of Example 8 was the same as that of Example 7. The processing was also the same as Example 7, except that the fraction of cBN component having a D50 of 0.5 micron (the finer grain size fraction) was milled with the ssTiCN—Al powder for 6 hrs. Then, the fraction of the cBN component with D50 of 2.5 microns (the coarser grain size fraction) was added to the mill and the entire mixture milled for an additional 15 minutes. The milled slurry was mixed with polyethylene glycol (PEG)-water solution and then spray dried. The compaction, firing, and HPHT sintering processes were the same as described in Example 7.

Figure 12A:
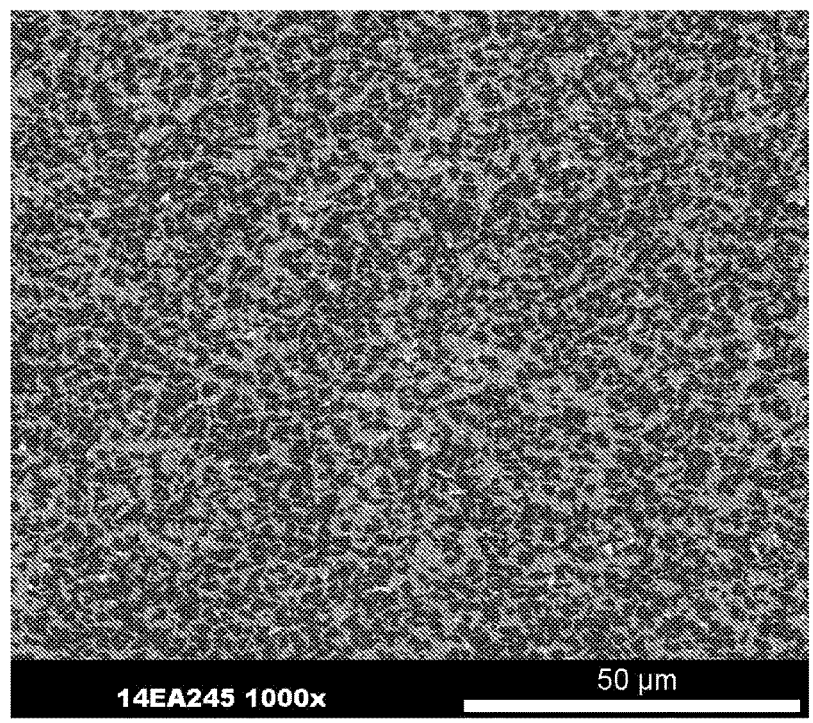
FIGS. 12A and 12B show the microstructure of Example 8 at low magnification (1000×) (FIG. 12A) and high magnification (10,000×) (FIG. 12B) as observed with SEM.
Figure 12B:
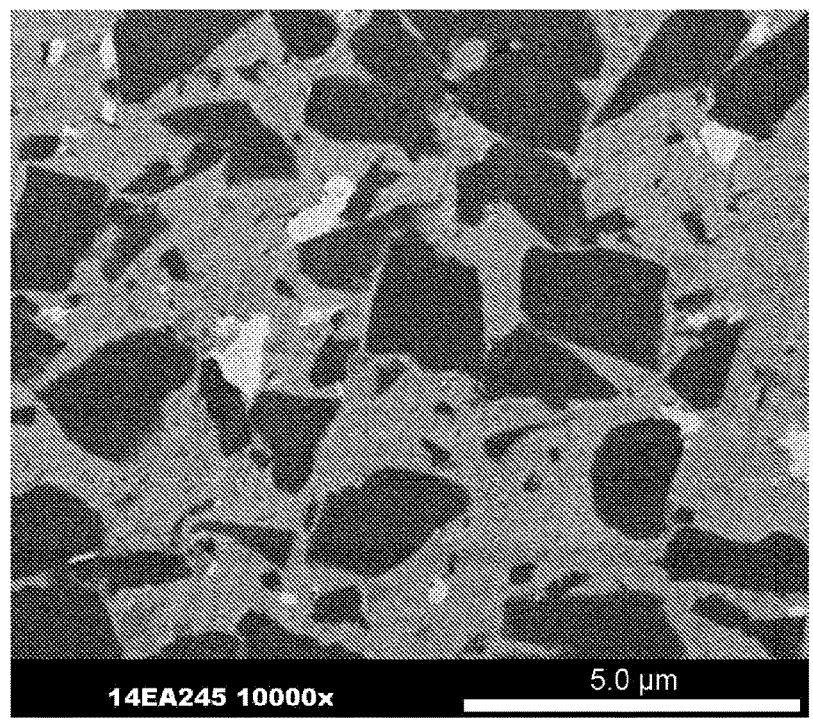

FIGS. 12A and 12B show the microstructure of Example 8 at low magnification (1000×) (FIG. 12A) and high magnification (10,000×) (FIG. 12B) as observed with scanning electron microscopy (SEM). After 6 hours of blending the binder with the first fraction of cBN having a D50 of 0.5 micron, and 15 minutes of blending with second fraction of cBN having a D50 of 2.5 microns, the average value of the cBN particle free diameter was 1.6 micron and the standard deviation was 0.31 micron. In this case, large agglomerates of fine cBN particles were not observed.

In summary, compared with conventional milling methods, the disclosed step-milling methods of multimodal cBN composite blend can significantly improve the cBN dispersion with control of the amount of mill debris. In Method 1 (FIG. 2A), the final particle size of binder is restricted by the particle size of the fine cBN after the concurrent milling. Method 2 (FIG. 2B) provides individual control of the binder particle size after milling, but the total milling time might be longer than that of Method 1 due to the extra milling step 210. When the particle size of binder can be similar to that of the fine cBN, Method 1 is sufficient enough. However, when it is desired to have significantly smaller binder particle size compared to the fine cBN, method 2 should be used.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A method of preparing a cBN composite powder in a multi-step milling process with controlled milling debris production, the method comprising:
    forming a first powder mixture by adding one or more binder component materials and a first cBN component to milling equipment, the one or more binder component materials having an initial D50 particle size;
    milling the first powder mixture for a first milling time suitable to reduce the initial D50 particle size at least 50%;
    combining a second cBN component with the milled first powder mixture to form a second powder mixture; and
    milling the second powder mixture for a second milling time to form the cBN composite powder, the second milling time less than the first milling time,
    wherein a ratio of the D50 value of the second cBN component to the D50 value of the first cBN component is at least 3.

2. The method of claim 1, the method further comprising premilling the binder component before forming the first powder mixture.

3. The method according to claim 1, wherein the D50 value of the first cBN component is between 0.2 micron and 2.0 microns and wherein the D50 value of the second cBN component is between 1.2 micron and 6.0 microns.

4. The method according to claim 1, wherein the milled binder component materials include powders having a composition that is selected from the group consisting of oxides, nitrides, and carbides of Group IV, V and VI elements of the periodic table and combinations thereof.

5. The method according to claim 4, wherein the milled binder component materials further include a composition that is selected from the group consisting of TiN, TiC, Ti(C,N), ZrN, Co, Al, and mixtures thereof.

6. The method according to claim 1, wherein cBN is present in the milled second powder mixture in an amount between 5 and 70 wt %.

7. The method according to claim 1, wherein the ratio of the mass of the first cBN component to the mass of the second cBN component is in a range from 0.04 to 2.0.

8. The method according to claim 7, wherein the ratio of the mass of the first cBN component to the mass of the second cBN component is less than 0.11.

9. The method according to claim 7, wherein the ratio of the mass of the first cBN component to the mass of the second cBN component is greater than 1.0.

10. The method according to claim 1, wherein the cBN composite powder has a multimodal particle size distribution.

11. The method according to claim 1, wherein the ratio of the D50 value of the second cBN component to the D50 value of the first cBN component is in a range of 3.0 to 10.

12. The method according to claim 11, wherein the D50 value of the first cBN component is between 0.2 micron and 2.0 microns and wherein the D50 value of the second cBN component is between 1.2 micron and 6.0 microns.

13. The method according to claim 11, wherein the ratio of the D50 value of the second cBN component to the D50 value of the first cBN component is in a range of 4.0 to 6.0.

14. A method of forming a cBN-based ceramic from a cBN composite powder that is prepared in a multi-step milling process with controlled milling debris production, the method comprising:
    forming a first powder mixture by adding one or more binder component materials and a first cBN component to milling equipment;
    milling the first powder mixture for a first time period;
    combining a second cBN component with the milled first powder mixture to form a second powder mixture;
    milling the second powder mixture for a second time period to form the cBN composite powder; and
    forming a cBN-based ceramic by subjecting the cBN composite powder to a HPHT process,
    wherein the first cBN component has a first D50 value and the second cBN component has a second D50 value,
    wherein a ratio of the second D50 value to the first D50 value is at least 3,
    wherein the cBN-based ceramic has an average value of cBN particle free diameter of less than 2.0 microns, and
    wherein the ratio of the mass of the first cBN component to the mass of the second cBN component is in a range from 0.04 to 0.11.

15. The method of claim 14, further comprising premilling the binder component before forming the first powder mixture.

16. The method according to claim 14, wherein the standard deviation of the cBN particle free diameter is less than 0.35 micron.

17. The method according to claim 14, wherein the first D50 value is between 0.2 micron and 2.0 microns and wherein the second D50 value is between 1.2 micron and 6.0 microns.

18. The method according to claim 14, wherein the binder component materials include powders having a composition that is selected from the group consisting of oxides, nitrides, and carbides of Group IV, V and VI elements of the periodic table and combinations thereof.

19. The method according to claim 14, wherein the binder component materials further include a composition that is selected from the group consisting of TiN, TiC, Ti(C,N), ZrN, Co, Al, and mixtures thereof.

20. The method according to claim 14, wherein cBN is present in the milled second powder mixture in an amount between 5 and 70 wt %.

21. The method according to claim 14, wherein the cBN composite powder has a multimodal particle size distribution.

22. The method according to claim 14, wherein the ratio of the second D50 value to the first D50 value is in a range of 3.0 to 10.

23. The method according to claim 22, wherein the first D50 value is between 0.2 micron and 2.0 microns and wherein the second D50 value is between 1.2 micron and 6.0 microns.

24. The method according to claim 23, wherein the standard deviation of the cBN particle free diameter is less than 0.35 micron.

25. The method according to claim 14, wherein the cBN-based ceramic has an average value of cBN particle free diameter of less than 1.5 micron.

26. The method according to claim 25, wherein the cBN-based ceramic has an average value of cBN particle free diameter of less than 1.0 micron.

27. The method according to claim 26, wherein the cBN-based ceramic has an average value of cBN particle free diameter of less than 0.90 micron.

28. The method according to claim 16, wherein the standard deviation of the cBN particle free diameter is less than 0.30 micron.

29. The method according to claim 28, wherein the standard deviation of the cBN particle free diameter is less than 0.20 micron.

30. The method according to claim 29, wherein the standard deviation of the cBN particle free diameter is less than 0.15 micron.

31. The method according to claim 22, wherein the ratio of the second D50 value to the first D50 value is in a range of 4.0 to 6.0.

32. The method according to claim 24, wherein the standard deviation of the cBN particle free diameter is less than 0.30 micron.

33. The method according to claim 32, wherein the standard deviation of the cBN particle free diameter is less than 0.20 micron.

34. The method according to claim 33, wherein the standard deviation of the cBN particle free diameter is less than 0.15 micron.

35. A method of preparing a cBN composite powder in a multi-step milling process with controlled milling debris production, the method comprising:
   forming a first powder mixture by adding one or more binder component materials and a first cBN component to milling equipment, the one or more binder component materials having an initial D50 particle size;
   milling the first powder mixture for a first milling time suitable to reduce the initial D50 particle size at least 90%;
   combining a second cBN component with the milled first powder mixture to form a second powder mixture; and
   milling the second powder mixture for a second milling time to form the cBN composite powder, the second milling time less than the first milling time,
   wherein a ratio of the D50 value of the second cBN component to the D50 value of the first cBN component is at least 3.

36. A method of preparing a cBN composite powder in a multi-step milling process with controlled milling debris production, the method comprising:
   forming a first powder mixture by adding one or more binder component materials and a first cBN component to milling equipment, the one or more binder component materials having an initial D50 particle size;
   milling the first powder mixture for a first milling time suitable to reduce the initial D50 particle size at least 50%;
   combining a second cBN component with the milled first powder mixture to form a second powder mixture; and
   milling the second powder mixture for a second milling time to form the cBN composite powder, the second milling time less than the first milling time,
   wherein a ratio of the D50 value of the second cBN component to the D50 value of the first cBN component is at least 3, and
   wherein the ratio of the mass of the first cBN component to the mass of the second cBN component is less than 0.11.

* * * * *